United States Patent [19]

Peiffer et al.

[11] Patent Number: 4,520,158
[45] Date of Patent: May 28, 1985

[54] NONAQUEOUS SOLVENT SOLUBLE POLYAMPHOLYTES-VISCOSIFIER AND SHEAR THICKENING ADDITIVE

[75] Inventors: Dennis G. Peiffer, East Brunswick; Robert D. Lundberg, Bridgewater; Ilan Duvdevani, Leonia; Warren A. Thaler, Flemington, all of N.J.

[73] Assignee: Exxon Research & Engineering Co., Florham Park, N.J.

[21] Appl. No.: 638,302

[22] Filed: Aug. 6, 1984

[51] Int. Cl.³ .................... C08K 5/01; C08L 39/00
[52] U.S. Cl. .................... 524/481; 524/484; 524/516; 524/548
[58] Field of Search ............... 524/107, 548, 516, 484, 524/481

[56] References Cited

U.S. PATENT DOCUMENTS

| | | | |
|---|---|---|---|
| 2,770,603 | 11/1956 | Lynch | 524/548 |
| 2,795,567 | 6/1957 | Ruehrwein | 524/548 |
| 3,423,358 | 1/1969 | Burke, Jr. | 524/548 |
| 3,700,619 | 10/1972 | Burke, Jr. | 524/548 |
| 3,836,511 | 9/1974 | O'Farrell et al. | 525/353 |
| 3,950,294 | 4/1976 | Connelly et al. | 524/577 |
| 4,076,699 | 2/1978 | Grimand et al. | 525/333.5 |
| 4,107,132 | 8/1978 | Burke, Jr. | 524/548 |
| 4,163,740 | 8/1979 | Malassine et al. | 524/548 |
| 4,254,016 | 3/1981 | Onizawa | 524/548 |
| 4,263,419 | 4/1981 | Piestert et al. | 525/309 |

Primary Examiner—Joseph L. Schofer
Assistant Examiner—N. Sarofim
Attorney, Agent, or Firm—Richard E. Nanfeldt

[57] ABSTRACT

A process for increasing the viscosity of a hydrocarbon organic liquid under increasing shear rate which includes the step of:

(a) forming a solution of said hydrocarbon organic liquid and a polyampholyte having about 1 to about 500 milliequivalents of sulfonate groups per 100 gms. of said polyampholyte, wherein the concentration of said polyampholyte is about 0.01 to about 20 wt. %, said polyampholyte having the formula:

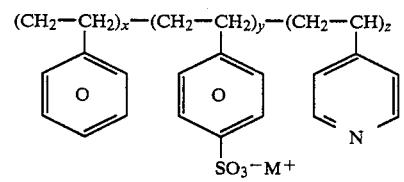

wherein X is about 40 to about 98 mole %, y is about 1 to about 50 mole %, and z is about 1 to about 50 mole %, wherein y and z are less than 60 mole %, and M is an amine or a metal cation selected from the group consisting of aluminum, iron, lead, Groups IA, IIA, IB and IIB of the Periodic Table of Elements; and (b) subjecting said solution to increasing shear rate to increase the viscosity of said solution by at least 10% as said shear rate increases.

7 Claims, 6 Drawing Figures

REDUCED VISCOSITY - CONCENTRATION PROFILES OF A 2.6 MOLE % Zm - cps AND ITS UNSULFONATED COUNTERPART IN XYLENE / OLEYL ALCOHOL SOLUTION (96/4)

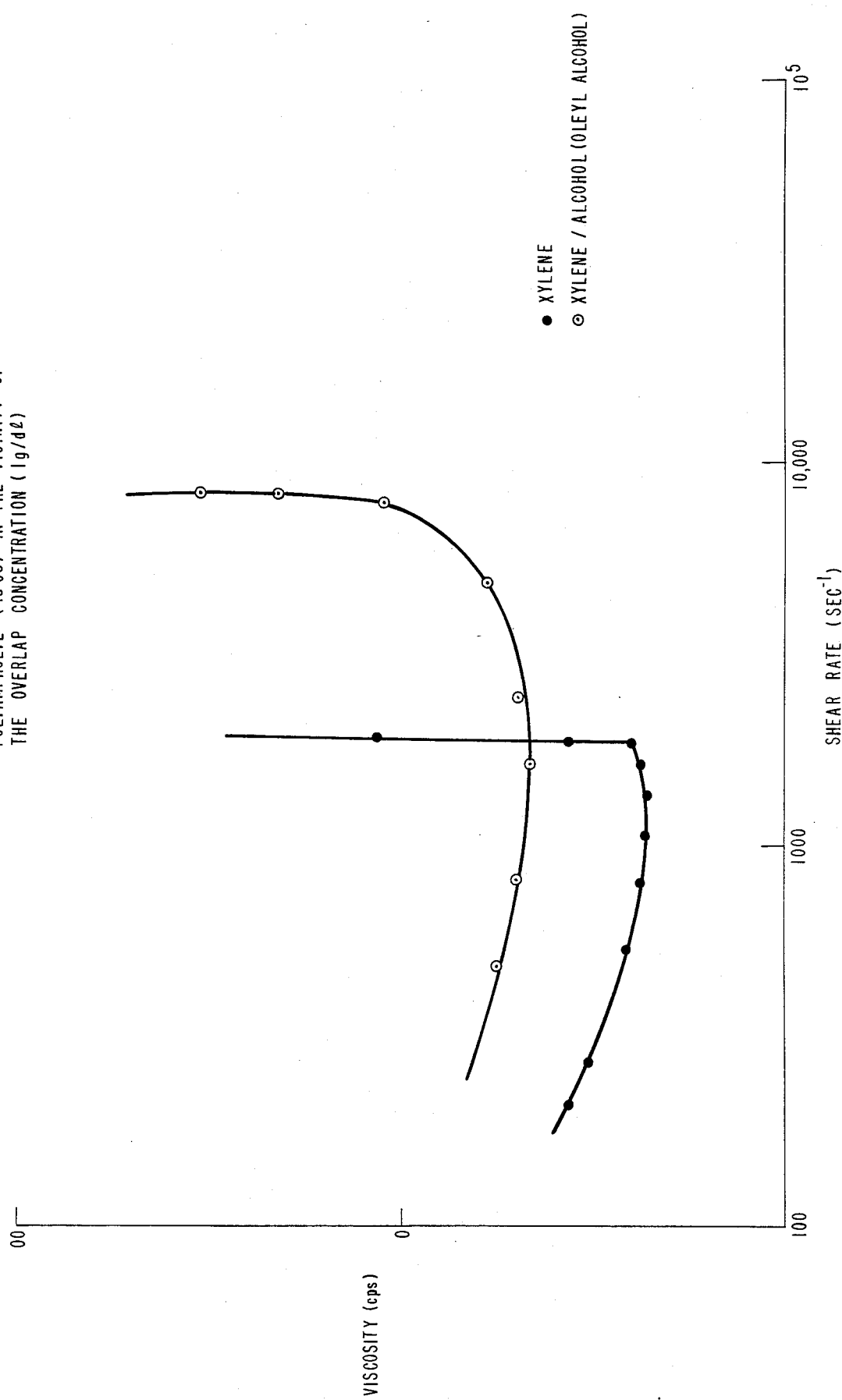

NONAQUEOUS SOLVENT SOLUBLE POLYAMPHOLYTES-VISCOSIFIER AND SHEAR THICKENING ADDITIVE

FIELD OF THE INVENTION

The present invention relates to a process for the viscosification of an organic liquid which comprises the step of forming a solution of a polyampholyte dissolved in a nonpolar hydrocarbon organic liquid, wherein the organic liquid containing the polyampholyte has improved viscosification properties and exhibits shear thickening at increased shear rates.

DESCRIPTION OF PRIOR ART

In recent years, there has been a renewed interest in the physical properties of polymeric complexes (i.e., polyampholytes). These materials have a variety of interesting properties since, for all practical purposes, the cations and anions are chemically attached to the molecular structure of the macromolecules. The counterions of any type are not free to move into the bulk solution as found in classical polyelectrolytes. In addition, it is generally assumed that each individual polymer chain possesses an equal number of cations and anions.

Salamone et al., of the University of Lowell (Massachusetts) are investigating ampholytic polymers as a part of their research program. They have studied the solution properties of divinylic cationic-anionic monomer pairs and also cationic-anionic monomer pairs with a neutral comonomer. This latter group of materials contains styrene as the neutral comonomer (J. Polym. Sci. Al, 18, 2983 [1980]) which can be incorporated into the ampholytic macromolecular structure through both solution or emulsion polymerization schemes. Apparently, other neutral vinylic monomers (i.e., acrylamide) were also polymerized (Gordon Research Conference—1981); but as of the present time, reports of this work have not been published in the scientific literature. However, in all of Salamone's work, detailed descriptions of his synthesis is reported. In all instances, the polymerization of the anionic-cationic monomeric species occurred via an "ion-pair comonomers that have no nonpolymerizable counterions present" (J. Polym. Sci.-Letters, 15, 487 (1977). Apparently, the physical and chemical properties of these ion-pair comonomers are different than the individual ions (J. Polym. Sci.-Letters, 15, 487 (1977)).

Polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to nonaqueous solutions, hydrocarbon based solvent soluble nonionic polymers and low charge density sulfonated ionomers are quite useful in this regard and are the most commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply C*. It should be noted that in most nonionic polymers of commercial interest, a relatively large amount of polymer is required prior to reaching C*. Therefore, this approach is undesirable from an economic viewpoint. Moreover, the rheological properties of many of these nonionic systems have been published. The results of these studies show that, in general, these solutions are shear thinning over all shear rates investigated.

This invention teaches that polymeric ampholytes can be useful in viscosifying nonaqueous solution systems. More importantly, these polyampholytes are shear thickening over a broad shear rate range, and even more important, this shear thickening phenomena occurs both above and below C*. These results are unexpected since the general tendency of nonionic macromolecules in these types of nonaqueous solutions shows marked shear thinning or, in other words, dramatic reduction in thickening efficiency occurs as the shear rate is changed.

There are many applications for thickened or gelled solutions of polymers in organic liquids which are quite diverse. There are also a number of physical and chemical techniques for preparing such systems. The present invention is concerned with a process for creating a liquid which increases in viscosity with increasing shear rate. The potential applications for this process and the products derived therefrom will be evident in the instant application. Some of these applications are as a viscosifier and shear thickening additive for organic liquids or solutions, for gelling an organic liquid and for antimisting applications.

Shear thickening fluids are rare and have mostly been demonstrated in suspensions (W. H. Bauer and E. A. Collins in "Rheology", Vol. 4, edited by F. R. Eirich, page 459, Academic Press, 1967). Polymer solutions and melts are known, on the other hand, to exhibit strong shear thinning behavior while most liquids of lower molecular weight are Newtonian.

This invention teaches the enhancement of the viscosity of hydrocarbon solutions with shear rate by preparing polymers which are capable of building large networks.

In order to avoid phase separation of the polyampholyte in solution, the charge density along the polymer backbone should be relatively low. The resulting solution of such a polyampholyte is then significantly more viscous than solutions containing the individual polymers, provided that the total numbers of negative and positive charges are correctly balanced.

This invention further teaches that, for a given balance of the various parameters that may be varied in an polyampholyte solution, an unexpected shear thickening behavior (Dilatant or Rheopectic Behavior) may be obtained. These parameters include:

Backbone nature of each of the polymers (or copolymers).

The charge densities along the polymer backbones.

The molecular weight of each polymer.

The ratio between the polymers introduced into solution.

The solvent (and cosolvent, if any).

The concentration of polymer in solution.

We report the finding that low-charge density polymerampholytes are useful in viscosifying relatively nonpolar solutions (as required in a variety of various pharmaceutical applications, well control and workover fluids, and a host of other systems containing a hydrocarbon-based solvent). These complexes are soluble in a nonpolar solution, but more importantly, possess a substantially higher viscosity than the corresponding individual components.

SUMMARY OF THE INVENTION

The present invention relates to a process for the viscosification of a nonpolar organic hydrocarbon liquid having a viscosity typically, but not necessarily less than about 10 cps. at 100° F. which includes the step of forming a solution of a polyampholyte in the nonpolar organic hydrocarbon liquid; wherein the resultant solution of the nonpolar organic hydrocarbon liquid has a viscosity of at least about 10 cps at 100° F. and furthermore exhibits a further increase in viscosity as shear rate increases.

The instant invention describes an economical process for forming a highly viscous organic hydrocarbon solution containing a soluble polyampholyte.

This instant invention also provides a process for forming a homogeneous solution which can be used as a viscosifier for hydrocarbon systems, said fluid displaying shear thickening behavior.

This instant invention also provides a process for forming a homogeneous solution which can be used as a progressive thickener for hydrocarbon systems under high shear conditions.

GENERAL DESCRIPTION

The present invention relates to a process for the viscosification of a nonpolar organic hydrocarbon liquid having a viscosity typically, but not necessarily less than about 10 cps. at 100° F. which includes the step of forming a solution of a polyampholyte in the nonpolar organic hydrocarbon liquid; wherein the resultant solution of the nonpolar organic hydrocarbon liquid has a viscosity of at least about 10 cps at 100° F. and furthermore exhibits a further increase in viscosity as shear rate increases.

The component materials of the instant process generally include a water insoluble, oil soluble polyampholyte dissolved in an organic hydrocarbon solvent system to form a solution with a concentration level of 0.01 to about 20 weight percent of the polyampholyte in solution.

Another aspect of the instant invention relates to the use of these polyampholytes in nonpolar hydrocarbon solvents as a shear thickening agent under increased shear conditions.

Another aspect of the instant invention relates to the observation that the thickening aspects of these polyampholytes can be markedly enhanced with the use of a suitable low molecular weight polar cosolvent.

The polyampholytes of the instant invention are terpolymers of a nonionic monomer, a sulfonate-containing monomer and an amine-containing monomer. The terpolymers of the instant invention are formed by a free radical polymerization of the amine-containing monomer and the nonionic monomer to form a copolymer of the nonionic monomer and the amine-containing monomer. This copolymer is subsequently sulfonated according to the procedures of U.S. Pat. No. 3,836,511, which is hereby incorporated by reference, to form the terpolymer of the nonionic monomer, the sulfonate-containing monomer and the amine-containing monomer.

A suitable oil soluble and water insoluble terpolymer of the instant invention is styrene/metal styrene sulfonate/vinyl pyridine which has the formula:

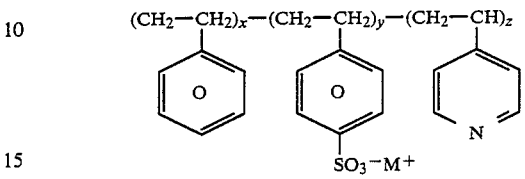

wherein x is about 40 to about 98 mole %, more preferably about 50 to about 95 mole %, and most preferably about 80 to about 90, y is about 1 to about 50 mole %, more preferably about 2 to about 20 mole %, and most preferably about 2 to about 10 mole %, and z is about 1 to about 50 mole %, more preferably about 2 to about 20, and most preferably about 2 to about 10, wherein y and z are less than 60 mole %, and M is an amine or a metal cation selected from the group consisting of aluminum, iron, lead, Groups IA, IIA, IB and IIB of the Periodic Table of Elements.

The molecular weight, as derived from intrinsic viscosities, for the terpolymers of styrene/metal styrene sulfonate/vinyl pyridine is about $1 \times 10^3$ to about $5 \times 10^7$, more preferably about $1 \times 10^4$ to about $2 \times 10^6$ and most preferably about $1 \times 10^5$ to about $1 \times 10^6$. The means for determining the molecular weights of the oil soluble and water insoluble terpolymers from the viscosity of solutions of the terpolymers comprises the initial isolation of the hydrocarbon soluble terpolymers, purification and redissolving the terpolymers in a nonaqueous solvent to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The styrene/vinyl pyridine copolymer is formed by free radical copolymerization using techniques well-known in the polymer literature. Such polymers can be prepared by a variety of techniques by reacting the amine-containing monomer (vinyl pyridine) with monomers collected from the group consisting of styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinyl pyridine content of the preferred copolymer of styrene and vinyl pyridine is about 1 to about 50 mole percent, more preferably about 2 to about 20 mole percent and most preferably about 2 to about 10 mole percent. The number average molecular weight of the copolymer as measured by GPC is about 10,000 to about 10,000,000 preferably about 20,000 to about 5,000,000 and most preferably about 30,000 to about 2,000,000.

The amine-containing copolymer is typically a polymeric backbone where the nitrogen elements are in the chain or pendant to it. Such a polymer may be obtained by direct copolymerization of a monomer containing the basic moiety with other monomers, or by grating a monomer containing the basic moiety on to a polymerized chain. Monomers can be chosen from vinyl monomers leading to hydrocarbon soluble polymers such as styrene, t-butyl sytrene, acrylonitrile, isoprene, butadiene, acrylates, methacrylates and vinyl acetate. Monomers containing a basic moiety will be those who contain amine or alky amine groups or pyridine groups, such as vinyl pyridine.

Preferably, the amine content in the amine-containing copolymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The amine-containing copolymer of styrene and vinyl pyridine is sulfonated according to the procedure of U.S. Pat. No. 3,642,728 which is herein incorporated by reference to form the terpolymer of styrene/styrene sulfonic acid/vinyl pyridine which is subsequently neutralized with an amine or metal cation to form the terpolymer of styrene/neutralized styrene sulfonate/vinyl pyridine.

The number of sulfonate groups contained in the terpolymer is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. An alternate way of expressing this is to state the sulfonate level in terms of milliequivalents (meq.) of sulfonic acid groups per 100 gms of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the terpolymer will comprise from about 1 meq. up to 500 meq. of sulfonate groups per 100 g. of polymer, more preferably about 10 meq. to about 100 meq. of sulfonate groups per 100 grams of polymer. The unneutralized sulfonate terpolymers in the instant invention are neutralized with the basic materials selected from the group consisting of Groups IA, IIA, IB and IIB of the Periodic Table of the Elements and lead, aluminum and iron. A preferred counterion for this invention is zinc, as explained below.

Neutralization of the unneutralized sulfonated terpolymers with appropriate metal hydroxides, metal acetates, metal oxides, etc. can be conducted by means well-known in the art. For example, the sulfonation process of the copolymer containing a small 0.3 to 1.0 mole % unsaturation, can be conducted in a suitable solvent such as 1,2-dichloroethane with acetyl sulfate as the sulfonating agent. The resulting sulfonic acid derivative can then be neutralized with a number of different neutralization agents such as zinc acetate and similar metal salts. The amounts of such neutralization agents employed will normally be stoichiometrically equal or in some excess to the amount of free acid in the polymer plus any unreacted reagent which still is present. It is preferred that the amount of sulfonating agent originally employed plus 10% more to ensure full neutralization. The use of more of such neutralization agent is not critical. Sufficient neutralization agent is necessary to affect at least 50% neutralization of the sulfonic acid groups present in the polymer, preferably at least 90%, and most preferably essentially complete neutralization of such acid groups should be affected.

The degree of neutralization of said sulfonate groups may vary from 50 to 500 mole %, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the sulfonate groups, amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonate group interacts much more strongly with the vinyl pyridine in the terpolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free sulfonic acid of the terpolymer, which will also interact with the vinyl pyridine. In this latter case, it is clear that the interaction is a classic acid-base interaction, while with the transition metals, a true coordination complex is created, which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so far removed from their expected stoichiometry, (based on small molecule analogs). Therefore, only those polymer backbones (i.e., as measured in the absence of ionic groups) having a solubility parameter less than 10.5 are suitable in this invention.

The concentration of the polyampholytes in the hydrocarbon organic liquid which exhibits shear thickening is about 0.01 to about 20 grams of polyampholyte per 100 grams of hydrocarbon organic liquid, more preferably about 0.04 to about 10, and most preferably about 0.05 to about 5. The hydrocarbon organic liquid which has a solubility parameter of less than 9.5 and is selected from the group consisting of mineral oil, synthetic oil, alkanes, cycloalkanes and aromatics and mixtures thereof.

DESCRIPTION OF THE PREFERRED EMBODIMENTS

Figure 1:
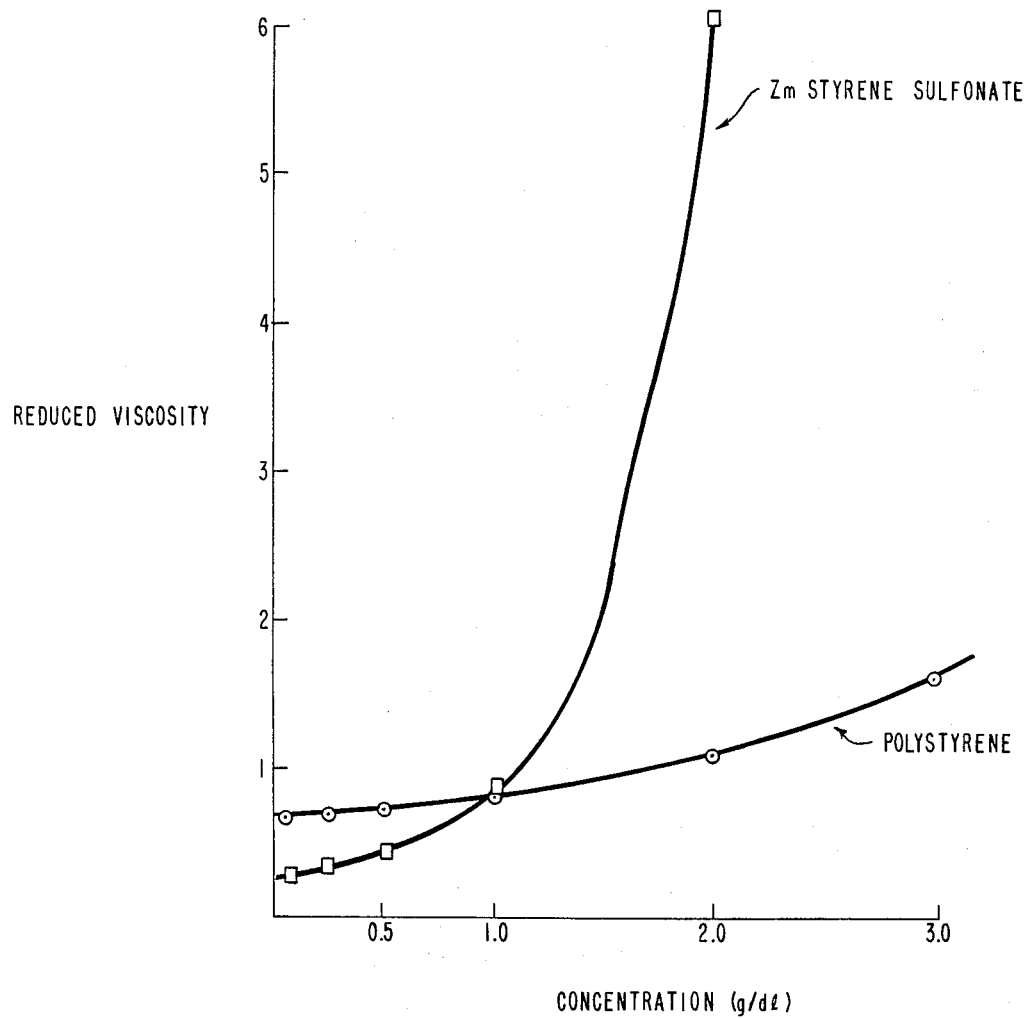

The following examples illustrate the present invention, without; however, limiting the same hereto.

EXAMPLE 1

A representative example for the synthesis of the styrene-4 vinyl pyridine copolymer which is subsequently sulfonated is described below.

Into a 1 liter, 4 neck flask, add:
50 g styrene
3.2 g sodium lauryl sulfate
120 ml distilled water
0.2 g potassium persulfate
0.05 g dodecylthiol
1.1 g 4-vinyl pyridine The solution was purged with nitrogen gas for one hour to remove dissolved oxygen. As the nitrogen gas purging began, the solution was heated to 50° C. After 24 hours, the polymer was precipitated from solution with a large excess of acetone. Subsequently, the polymer was washed with acetone and dried in a vacuum oven at 60° C. for 24 hours. Elemental analysis showed that the copolymer contained 2.5 mole % 4-vinyl pyridine.

EXAMPLE 2

A representative example for the sulfonation of the styrene-4 vinyl pyridine copolymer is described below.

The following procedure was generally followed: 50 g the copolymer was dissolved in 500 ml of 1,2-dichloroethane. The solution was heated to 50° C., and the requisite amount of acetyl sulfate was added, in this case, 34.6 ml of 0.996M acetyl sulfate (24.5 meq.). The solution was stirred for 60 minutes at 50° C., and the reaction was terminated by the addition of 40 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and sodium. The level of sulfonate incorporated was determined by sulfur analysis.

Elemental analysis shows that 1.6 mole % sulfonate groups was incorporated into the polymer chain structure.

EXAMPLE 3

FIG. 1 shows the effect of polymer concentration on the reduced viscosity-concentration profile of a zinc styrene sulfonate copolymer and its nonionic polystyrene counterpart. This is quite typical behavior for a sulfonated ionomer having a sulfonate of 2.6 mole percent and is useful as a comparison with regard to the polyampholyte terpolymers.

Figure 2:
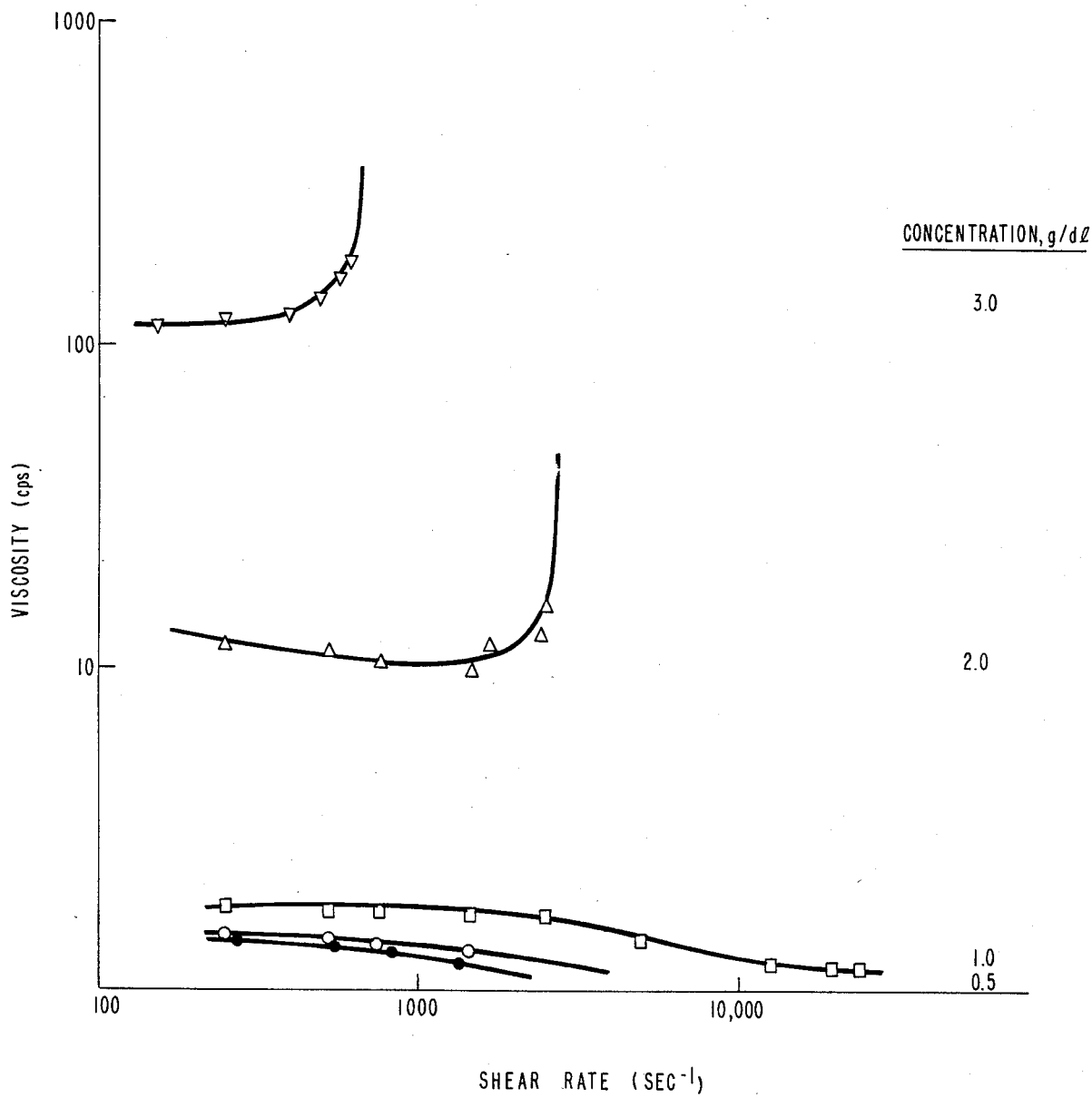

At low concentration, the reduced viscosity of the sulfonate ionomer is markedly reduced over that of polystyrene. This is due to the strong intramolecular associations preventing the expansion of the hydrodynamic volume of the chain. However, as the concentration is increased, the reduced viscosity of the sulfonate ionomer overtakes and subsequently surpasses its nonionic counterpart (at about 1 g/dl). Thus, the crossover point (which approximates C*) in these curves is important with regard to the impact of the ionic associations on solution properties. Interestingly, shear thickening is observed in these materials at concentrations greater than this crossover point (see FIG. 2). Therefore, these sulfonated ionomers are effective shear thickening additives above C*. Below C*, typical shear thinning behavior is observed.

EXAMPLE 4

Figure 3:
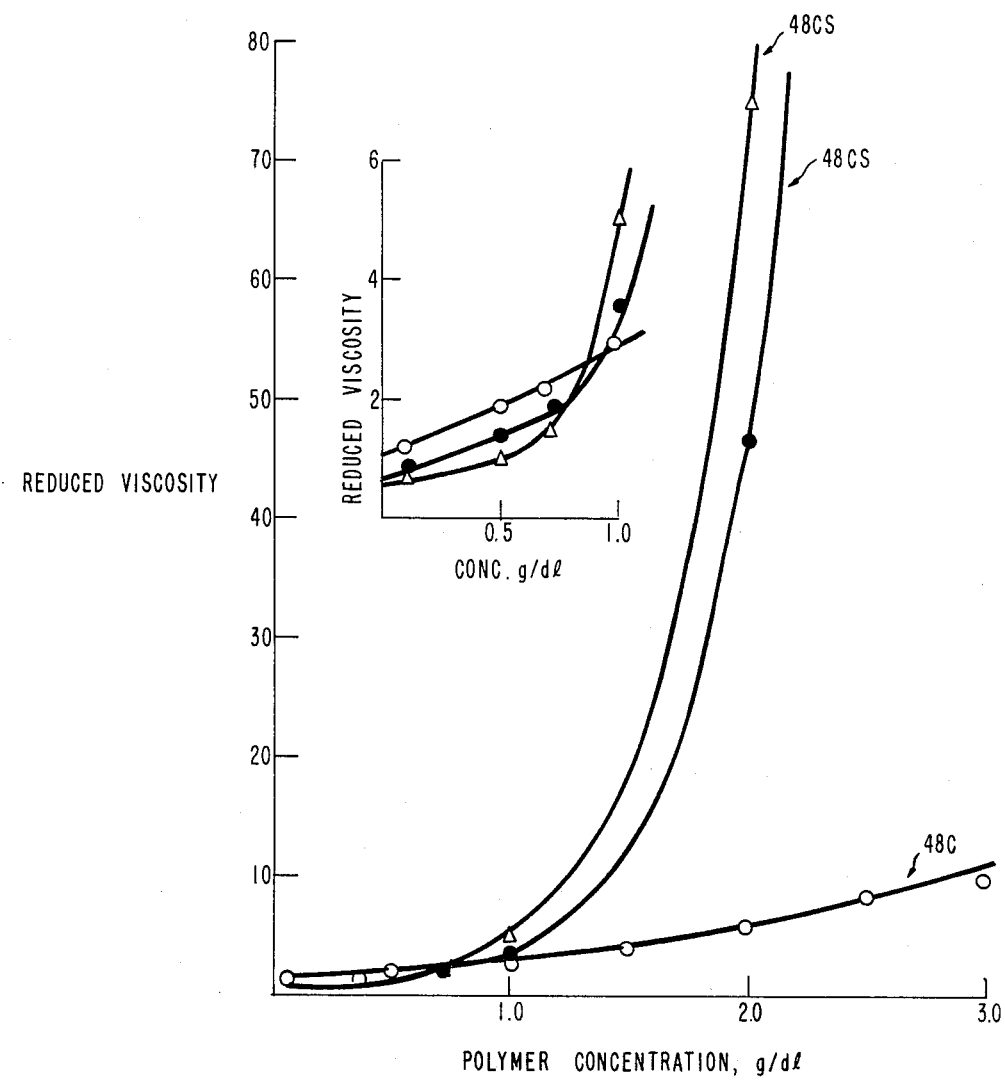
Figure 4:
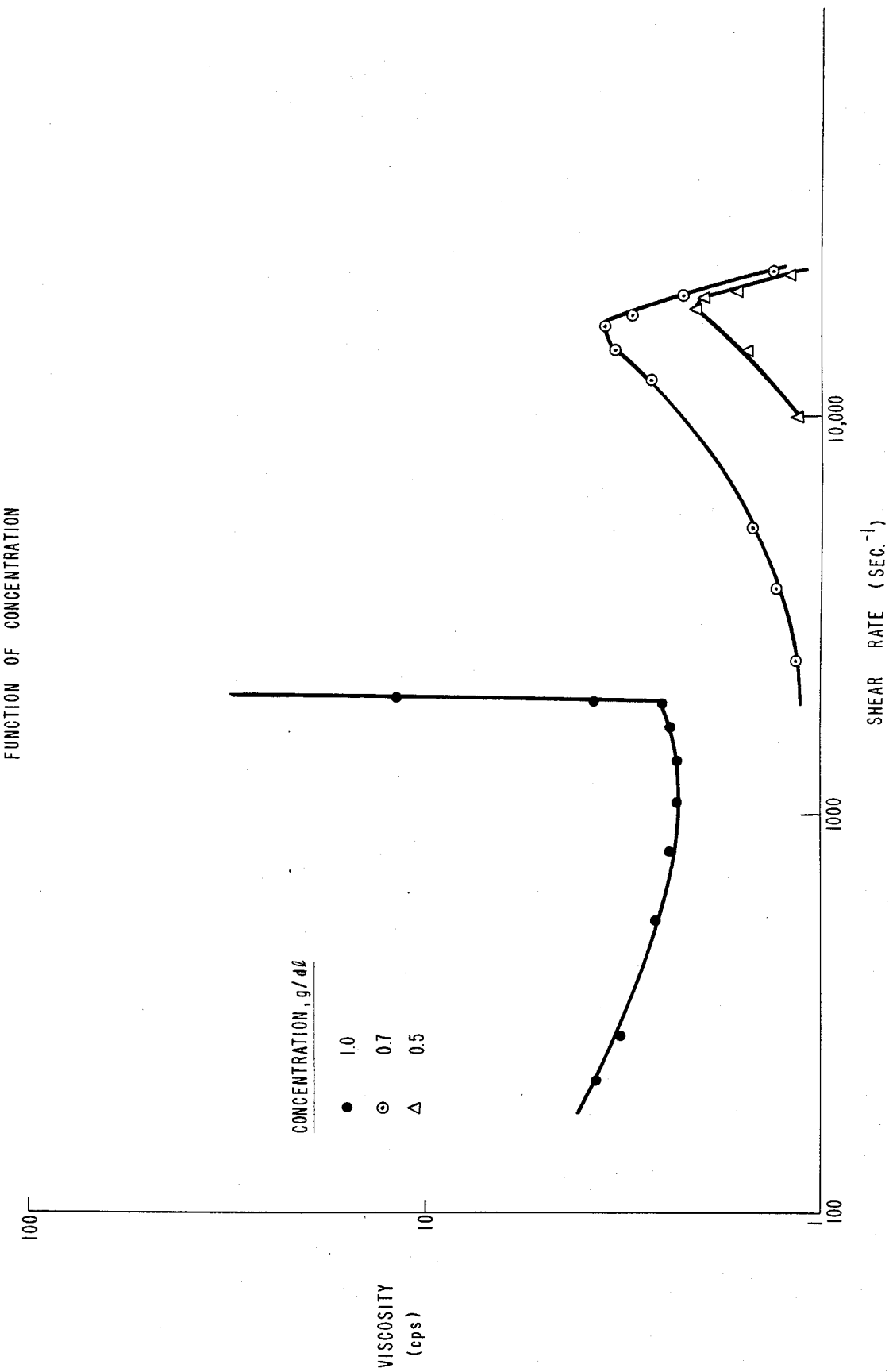

FIG. 3 shows the influence of polymer concentration on the reduced viscosity-concentration profile of the zinc styrene sulfonate, styrene, 4-vinyl pyridine terpolymer polyampholyte. As anticipated, the reduced viscosity of the polyampholyte is significantly lower than its nonionic counterpart, i.e. styrene-4-vinyl pyridine copolymer, due to strong intramolecular associations. Again as the polymer concentration is increased, a crossover of the curves occurs (at approximately 0.9 g/dl). However, in these polyampholytic materials, shear thickening is observed both above and significantly below this crossover point. This is an unanticipated result with regard to both its shear thinning nonionic counterpart and the previously described homogeneously-charged sulfonate ionomers (Example 3).

EXAMPLE 5

Figure 5:
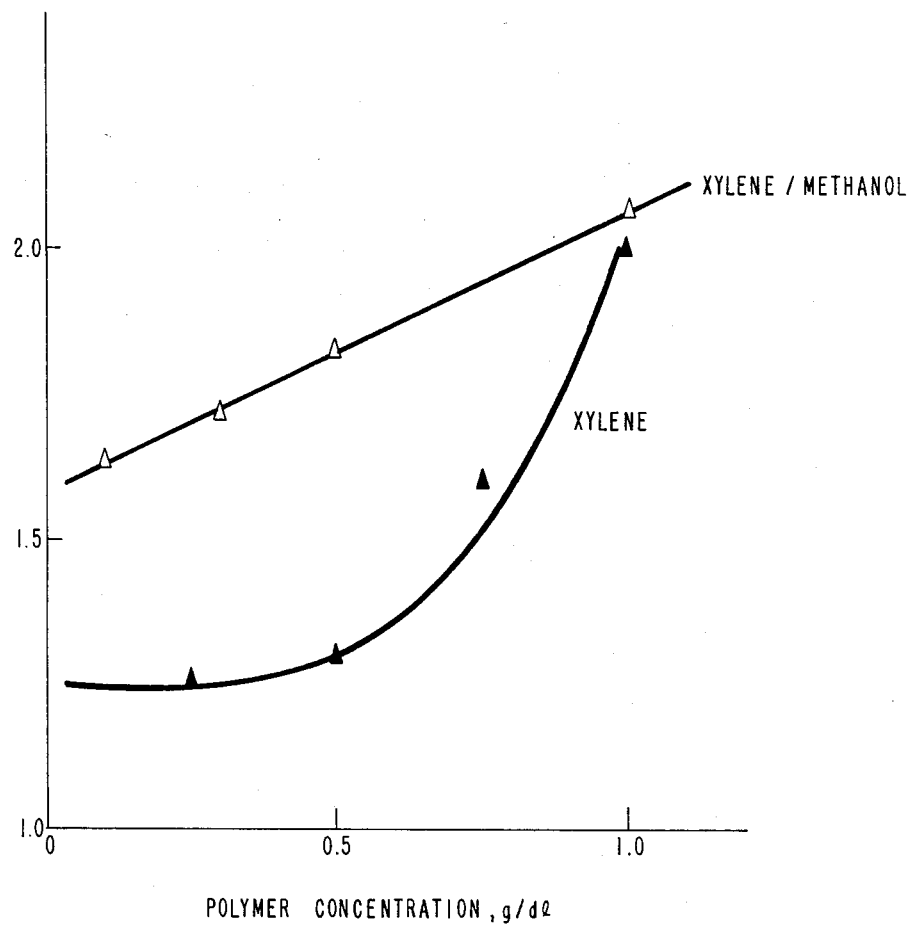

FIG. 5 shows the effect of polymer concentration on the reduced viscosity of a polyampholyte dissolved in two solvent systems—xylene and xylene containing a polar cosolvent (methanol). The data clearly shows that the reduced viscosity markedly rises with the addition of methanol. This phenomena can be directly related to an increase in the hydrodynamic volume of the polyampholyte due primarily to the loosening of the intramolecular interactions occurring between the sulfonate and pyridine moieties by the polar cosolvent.

EXAMPLE 6

FIG. 6 shows the influence of a shear field on the behavior of a polyampholyte in xylene and a xylene/alcohol solution. Contrary to expectations, i.e., with regard to the behavior of low charge density ionomers, the viscosity is significantly enhanced over a very broad shear rate range with the additional of a soluble, polar cosolvent. Interestingly, the ability of these material to shear thicken is not at all impaired (it has actually improved) in the presence of a polar cosolvent as is observed in sulfonated ionomers.

What is claimed is:

1. A process for increasing the viscosity of a hydrocarbon organic liquid under increasing shear rate which includes the step of:
    (a) forming a solution of said hydrocarbon organic liquid and a polyampholyte having about 1 to about 500 milliequivalents of sulfonate groups per 100 gms. of said polyampholyte, wherein the concentration of said polyampholyte is about 0.01 to about 20 wt.%, said polyampholyte having the formula:

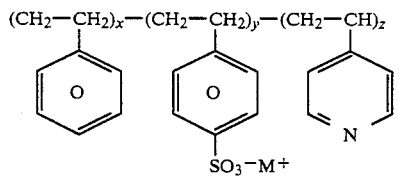

wherein x is about 40 to about 98 mole %, y is about 1 to about 50 mole %, and z is about 1 to about 50 mole %, wherein y and z are less than 60 mole %, and M is an amine or a metal cation selected from the group consisting of aluminum, iron, lead, Groups IA, IIA, IB and IIB of the Periodic Table of Elements; and (b) subjecting said solution to increasing shear rate to increase the viscosity of said solution by at least 10% as said shear rate increases.

2. A process according to claim 1 wherein said groups are neutralized with an ammonium or metal counterion.

3. A process according to claim 2 wherein said metal counterion is selected from the group consisting of transition elements.

4. A process according to claim 2 wherein said sulfonate groups are at least 90 mole percent neutralized.

5. A process according to claim 1 wherein said organic hydrocarbon liquid is selected from the group consisting of aromatic hydrocarbons, ketones, chlorinated aliphatic hydrocarbons, aliphatic hydrocarbons, cyclic aliphatic ethers, aliphatic ethers or organic aliphatic esters and mixtures thereof.

6. A process according to claim 1 wherein said organic liquid is selected from the group consisting of aliphatic hydrocarbons or aromatic hydrocarbons.

7. A process according to claim 1 wherein said organic liquid is selected from the group consisting of benzene, toluene, ethyl benzene, xylene, or styrene and mixtures thereof.

* * * * *